Patented Dec. 4, 1934

1,982,796

UNITED STATES PATENT OFFICE 1,982,796

UREA-FORMALDEHYDE REACTION PRODUCT AND PROCESS OF MAKING SAME

Melville C. Dearing, Palatine, Ill., assignor to Economy Fuse & Manufacturing Co., Chicago, Ill., a corporation of New York No Drawing. Application September 6, 1932
Serial No. 631,900

8 Claims. (Cl. 260—3)

This invention relates to a new and improved method of producing products of urea and formaldehyde of the type existing as an amorphous powder adapted to be molded under heat and pressure.

This invention also relates to the moldable product so produced.

It is an object of this invention to provide a novel and improved process of the type above referred to and to provide new and useful products which, when molded, yield objects having a high water resistance.

In English patent to Pollak No. 271,037, complete accepted July 30, 1928, is described a process wherein moldable products are obtained by reacting urea and formaldehyde under neutral or slightly alkaline conditions and then at a later stage, adding acid and continuing the heat treatment until dilution of the product causes the separation of a substance which may be used for hot molding operations.

As an alternative, the starting materials may be largely diluted, then caused to react under neutral or slightly alkaline conditions, and then treated with acid to cause separation of a product essentially similar to that obtained by the previously described process. In either case, it is found that the products are seriously affected by boiling water.

As the result of further experiments, it has now been found that better results, as far as water resistance is concerned, are obtained if the initial reaction is caused to occur under slightly acid conditions. At the present time, it is preferable to employ such acidity as corresponds to a pH of approximately 5.

By way of example, the process may be practiced as follows:

To 300 parts of 40% formaldehyde,—the pH of which had been adjusted to 5, add 800 parts of water and 60 parts of urea. Reaction is caused to occur by heating. After the solution has boiled one minute, 30 parts of urea are added. After another minute, 21 parts of urea are added. Continue boiling under a return condenser for one hour, then add two parts of concentrated hydrochloric acid (specific gravity 1.18) and continue the boiling five hours. Then add five parts of hydrochloric acid (specific gravity 1.18). Continue the refluxing for 14 hours more. During this time, a copious precipitate will be formed. The precipitate should be separated, washed and dried at room temperature. Molded objects produced therefrom are little effected by boiling water, that is much less effected than would have been the case if the initial reaction is caused to proceed under neutral or alkaline conditions.

It is to be understood that thiourea may be substituted in part for the urea. If desired, the urea and formaldehyde may be reacted in the presence of a pH of approximately 5 to form an intermediate product. The relatively concentrated solution so formed may then be diluted and treated with acid and subsequently heat treated to produce a water insoluble precipitate similar to that derived from the above example.

As a specific example, the eight hundred parts of water which are added with the urea in the production of the intermediate product as above set forth may be withheld and added after the intermediate product is formed. In all other particulars the process can be carried out in exactly the same manner.

I claim:

1. The process which comprises reacting approximately one mol of urea and two mols of aqueous formaldehyde in the presence of a pH of aproximately 5 to form a solution of an intermediate reaction product, diluting said solution with a relatively large volume of acidulated water, and subsequently heat treating until a water insoluble precipitate is formed.

2. The process which comprises reacting approximately one mol of urea and two mols of aqueous formaldehyde in the presence of a pH of approximately 5 to form a solution of an intermediate reaction product, diluting said solution with a relatively large volume of dilute hydrochloric acid and heat treating until a water insoluble precipitate is formed.

3. The process which comprises reacting urea and a formaldehyde solution in the presence of a pH of approximately 5 to form a solution of an intermediate reaction product, diluting said solution with acidulated water, and subsequently heat treating said dilute acidified solution until a water insoluble precipitate is formed.

4. The process which comprises reacting urea and a formaldehyde solution in the presence of a pH of approximately 5 to form a solution of an intermediate reaction product, diluting said solution with a relatively large volume of dilute hydrochloric acid, and subsequently heat treating said dilute acidified solution until a water insoluble precipitate is formed.

5. The process which comprises reacting three hundred parts of forty per cent formaldehyde having a pH of approximately 5 and one hundred and eleven parts of urea diluted with approximately eight hundred parts of water to form a solution of an intermediate product, acidifying said solution with approximately seven parts of concentrated hydrochloric acid and continuing the heat treatment until a water insoluble precipitate is formed.

6. The process which comprises reacting urea and a formaldehyde solution in the presence of a pH of approximately 5 to form a solution of an intermediate reaction product, diluting said solution with acidulated water, and subsequently refluxing until a water insoluble precipitate is formed and finally washing and drying said precipitate to form an amorphous molding powder.

7. A molding powder of a reaction product of urea and formaldehyde formed in accordance with the process defined in claim 6.

8. A heat and pressure hardened product produced by heat hardening a precipitate produced in accordance with the process described in claim 6.

MELVILLE C. DEARING.